United States Patent
Sun et al.

(10) Patent No.: US 11,940,585 B2
(45) Date of Patent: Mar. 26, 2024

(54) SYSTEM AND METHOD FOR ESTIMATING ONE-WAY PROPAGATION OPERATORS

(71) Applicant: SAUDI ARABIAN OIL COMPANY, Dhahran (SA)

(72) Inventors: Yimin Sun, The Hague (NL); Dirk Jacob Verschuur, Alphen aan den Rijn (NL)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/223,361

(22) Filed: Apr. 6, 2021

(65) Prior Publication Data

US 2022/0317325 A1    Oct. 6, 2022

(51) Int. Cl.
*G01V 1/50* (2006.01)
*G01V 1/28* (2006.01)
*G01V 1/30* (2006.01)

(52) U.S. Cl.
CPC ............ *G01V 1/50* (2013.01); *G01V 1/282* (2013.01); *G01V 1/306* (2013.01);
(Continued)

(58) Field of Classification Search
CPC .......... G01V 1/50; G01V 1/282; G01V 1/306; G01V 2210/6222; G01V 2210/6224; G01V 2210/67
See application file for complete search history.

(56) References Cited

U.S. PATENT DOCUMENTS 4,635,238 A * 1/1987 Gallagher ................ G01V 1/42
367/75
4,964,103 A * 10/1990 Johnson .................. G01V 1/301
367/53

(Continued)

FOREIGN PATENT DOCUMENTS

CN    104122585 A    10/2014
CN    103713315 B     7/2016

(Continued)

OTHER PUBLICATIONS

J. A. Schell and et al, "Dereverberation by Linear Systems Techniques", IEEE Transactions on Geoscience Electronics, vol. GE-9, No. 1, Jan. 1971 (Year: 1971).*

(Continued)

*Primary Examiner* — Douglas Kay
(74) *Attorney, Agent, or Firm* — Osha Bergman Watanabe & Burton LLP (57) ABSTRACT

A method is disclosed that includes obtaining a seismic data set and a seismic wave propagation velocity model and approximating the seismic wave propagation velocity model as a plurality of layers each bounded by a first and second bounding depth. For each of the plurality of layers, the method includes: simulation of the propagation of a seismic wave through the layer using a two-way seismic wave propagation simulator; forming an over-determined system of linear equations relating at least one mono-frequency component of the seismic wave at the first depth to one mono-frequency component at the second depth; and determining a plurality of one-way seismic wave propagation operators by inverting the over-determined system of linear equations. The method further includes processing the seismic data set using the one-way seismic wave propagation. A (Continued)

system and a non-transitory computer readable medium for implementing the method are also disclosed.

12 Claims, 8 Drawing Sheets

(52) U.S. Cl.
 CPC ............... *G01V 2210/6222* (2013.01); *G01V 2210/6224* (2013.01); *G01V 2210/67* (2013.01)

(56) References Cited

U.S. PATENT DOCUMENTS

| | | | |
|---|---|---|---|
| 6,049,759 | A | 4/2000 | Etgen |
| 2010/0088034 | A1 | 4/2010 | Hill |
| 2010/0135114 | A1 | 6/2010 | Teague et al. |
| 2010/0268471 | A1 | 10/2010 | Kiyashchenko et al. |
| 2013/0185032 | A1 | 7/2013 | Archer et al. |
| 2014/0222345 | A1* | 8/2014 | Langenwalter ........ G01V 1/303 702/14 |
| 2015/0276956 | A1 | 10/2015 | Khalil et al. |
| 2015/0293246 | A1 | 10/2015 | Dickens et al. |
| 2016/0281497 | A1* | 9/2016 | Tilke ....................... E21B 47/00 |
| 2017/0199289 | A1 | 7/2017 | Peng et al. |
| 2017/0242141 | A1 | 8/2017 | Cotton et al. |
| 2017/0299745 | A1 | 10/2017 | Kim et al. |
| 2020/0263529 | A1* | 8/2020 | Ahmed ............... E21B 47/0224 |
| 2020/0301035 | A1 | 9/2020 | Sun et al. |
| 2021/0332691 | A1* | 10/2021 | Zhang ..................... G01V 1/28 |

FOREIGN PATENT DOCUMENTS

| | | | | |
|---|---|---|---|---|
| CN | 106324662 B | * | 8/2018 | |
| CN | 106324662 B | | 8/2018 | |
| WO | WO-2004090573 A2 | * | 10/2004 | ............... G01V 1/28 |

OTHER PUBLICATIONS

Nolet, Guust. "Seismic wave propagation and seismic tomography." Seismic Tomography: With Applications in Global Seismology and Exploration Geophysics (1987): 1-23 (Year: 1987).*

Fomel, Sergey, Lexing Ying, and Xiaolei Song. "Seismic wave extrapolation using lowrank symbol approximation." Geophysical Prospecting 61.3 (2013): 526-536 (Year: 2013).*

Xu, Sheng, et al. "Inversion on reflected seismic wave." 2012 SEG Annual Meeting. OnePetro, 2012 (Year: 2012).*

Yang Yang, Yan, et al. "Seismic wave propagation and inversion with neural operators." The Seismic Record 1.3 (2021): 126-134 (Year: 2021).*

International Search Report and Written Opinion of the International Searching Authority issued in corresponding International Application No. PCT/US2022/023697, dated Apr. 19, 2022 (17 pages).

Kennett, Brian, "Seismic Wave Propagation in Stratified Media"; The Australian National University E Press; pp. v-288; 2009 (298 pages).

Jones, Ian F., "Tutorial: migration imaging conditions"; First Break; vol. 32, Issue 12; pp. 45-55; Dec. 2014 (11 pages).

* cited by examiner

SYSTEM AND METHOD FOR ESTIMATING ONE-WAY PROPAGATION OPERATORS

BACKGROUND

Seismic images are routinely used in the oil and gas industry to determine if a subterranean region has a high probability of containing oil or gas. Seismic images are constructed from seismic data acquired from sensors located on the Earth's surface, or in boreholes, above the subterranean region of interest.

Seismic data is composed of the reflections, or echoes, of seismic waves from seismic discontinuities in the subsurface. The construction of seismic images from seismic data typically includes a number of seismic processing steps. For example, multiple reflected echoes or seismic waves that have bounced off more than one discontinuity, may be suppressed using any one of a plurality of "demultiple" methods. In another example, the determination of a seismic propagation velocity model may be performed using one or more of a set of processes collectively termed "velocity analysis". In yet a further example, the determination of the positions within the subterranean region at which the seismic echoes are generated is determined using one or more "migration" methods.

Each of the seismic processing steps described above may require the numerical simulation of seismic wave propagation using a computer system. The computational cost and the time required to conduct these numerical simulations may be large because of the great quantity of recorded seismic data that must be processed and the complexity of the seismic wave propagation algorithms executed on the computer system. Consequently, simpler numerical simulation methods which are less accurate and complete but less computationally expensive than more accurate and complete methods are often used. In particular, a set of these methods that only model seismic wave propagation in one direction is often used. For example, this set of methods, termed "one-way propagators" may only simulate seismic waves propagating downwards into the subterranean region. Alternatively, one-way seismic wave propagators may only simulate waves propagating upwards.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining a seismic data set and a multi-dimensional seismic wave propagation velocity model and approximating, using a computer processor, the seismic wave propagation velocity model as a plurality of layers each bounded by a first bounding depth and a second bounding depth. For each of the plurality of layers, the method includes: simulation of the propagation of a seismic wave at the first bounding depth through the layer to the second bounding depth using a two-way seismic wave propagation simulator; forming an over-determined system of linear equations relating at least one mono-frequency component of the seismic wave at the first bounding depth to at least one mono-frequency component of the seismic wave at the second bounding depth; and determining a plurality of one-way seismic wave propagation operators by inverting the over-determined system of linear equations. The method further includes verifying that the plurality of one-way seismic wave propagation operators has been determined for each of the plurality of layers; and processing the seismic data set using at least one of the one-way seismic wave propagation operators for at least one of layers.

In general, in one aspect, embodiments relate to a non-transitory computer readable medium storing instructions executable by a computer processor, the instructions including functionality for: obtaining a seismic data set and a multi-dimensional seismic wave propagation velocity model; approximating the seismic wave propagation velocity model as a plurality of layers, each bounded by a first bounding depth and a second bounding depth; and selecting sequentially each layer and its first and second bounding depths from the plurality of layers and first and second bounding depths. The instructions further including functionality for: simulating the propagation of a seismic wave at the first bounding depth through the selected layer to the second bounding depth using a two-way seismic wave propagation simulator; forming an over-determined system of linear equations relating at least one mono-frequency component of the seismic wave at the first bounding depth to at least one mono-frequency component of the seismic wave at the second bounding depth; and determining a plurality of one-way seismic wave propagation operators by inverting the over-determined system of linear equations. The instructions still further including functionality for verifying that the plurality of one-way seismic wave propagation operators has been determined for each of the plurality of layers and processing the seismic data set using at least one of the one-way seismic wave propagation operators for at least one of layers.

In general, in one aspect, embodiments relate to a system for formation evaluation, that includes a seismic source to emit radiated seismic P-waves, a plurality of seismic receivers for detecting and recording a seismic data set generated by the radiated seismic P-waves, and a seismic processor. The a seismic processor is configured to: determine a multi-dimensional seismic wave propagation velocity model; approximate the seismic wave propagation velocity model as a plurality of layers each bounded by a first bounding depth and a second bounding depth; select, sequentially, each layer and its first and second bounding depths from the plurality of layers and first and second bounding depths. The seismic processor is further configured to: simulate the propagation of a seismic wave through the selected layer from the first bounding depth to the second bounding depth using a two-way seismic wave propagation simulator; form an over-determined system of linear equations relating at least one mono-frequency component of the seismic wave at the first bounding depth to at least one mono-frequency component of the seismic wave at the second bounding depth; and determine a plurality of one-way seismic wave propagation operators by inverting the over-determined system of linear equations. The seismic processor is still further configured to verify that the plurality of one-way seismic wave propagation operators has been determined for each of the plurality of layers and process the seismic data set using at least one of the one-way seismic wave propagation operators for at least one of layer.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein describe methods for calculating one-way seismic wave propagators and their use for the construction of seismic images. Embodiments further disclose the use of seismic images constructed using one-way seismic wave propagators to determine the presence of hydrocarbons in subsurface regions of interest and to plan the trajectory of one or more boreholes to produce hydrocarbons to the surface.

Figure 1:
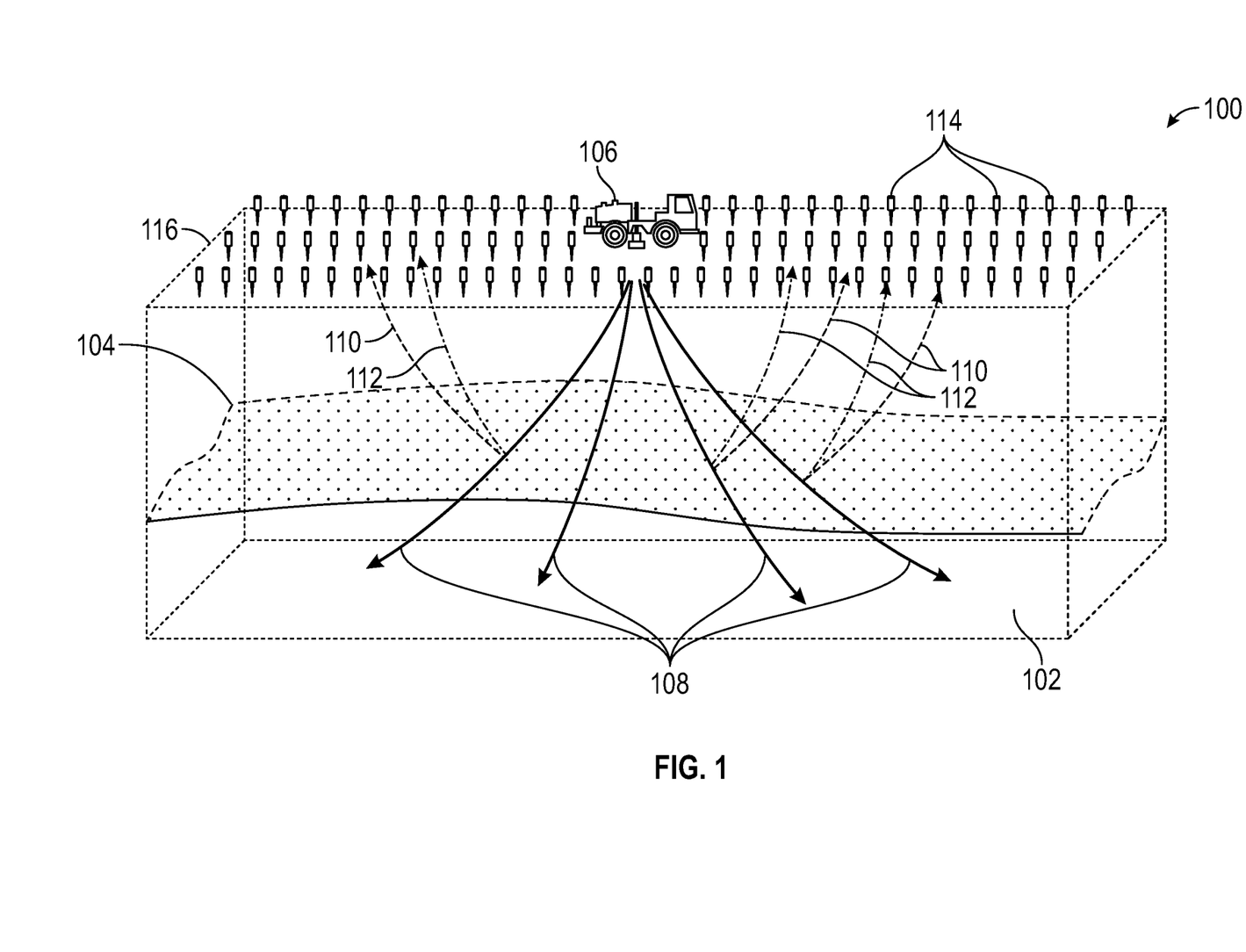
FIG. 1 depicts a seismic survey in accordance with one or more embodiments.

FIG. 1 shows a seismic survey (100) of a subterranean region of interest (102), which may contain at least one subsurface formation interface (104). The seismic survey (100) may utilize a seismic source at a plurality of seismic source locations (106) that may predominately radiate seismic P-waves (108). The seismic P-waves (which are sometimes referred to as pressure waves or compressional waves) may be reflected from subsurface formation interfaces (104) and return to the Earth's surface (116) as reflected seismic PP-waves (110). A reflected seismic PP-wave (110) propagates as P-wave both before and after the reflection of the radiated seismic P-waves (108) at the subsurface formation interface (104)

Radiated seismic P-waves also may be reflected by the subsurface formation interface (104) as converted seismic PS-waves (112). Converted seismic PS-waves (112) propagate as seismic S-waves (which are sometimes referred to as shear waves or secondary waves) after reflection at the subsurface formation interface (104). The relative amplitudes of the reflected seismic PP-wave (110) and the converted seismic PS-wave (112) are determined by the angle at which the radiated seismic P-wave (108) is incident on the subsurface formation interface (104) and the density and elastic stiffnesses on either side of the subsurface formation interface (104). The relative amplitudes of the reflected seismic PP-wave (110) and the converted seismic PS-wave (112) are governed by the continuity of displacement and stress boundary conditions across the subsurface formation interface (104). Generally, if the radiated seismic P-wave (108) is incident on the subsurface formation interface (104) at a perpendicular angle, only a reflected seismic PP-wave (112) will be created. However, at angles other than perpendicular, converted seismic PS-waves (112) and reflected seismic PP-waves must, typically, both be generated in order to satisfy the boundary conditions.

Reflected seismic PP-waves (110) and converted seismic PS-waves (112) both may be detected by seismic receivers (114) at or near the earth's surface (116). Seismic receivers (114) record the ground motion caused by both reflected seismic PP-waves (110) and by converted seismic PS-waves (112). Seismic receivers (114) may be single-component seismic receivers or multicomponent seismic receivers. Single component seismic receivers typically record only the ground motion in a vertical direction. Multicomponent seismic receivers (114) record the ground motion in a vertical direction and in one or two horizontal directions. Multicomponent seismic receivers (114) that record the ground motion in a vertical direction and two horizontal directions record two orthogonal horizontal directions.

Figure 2:
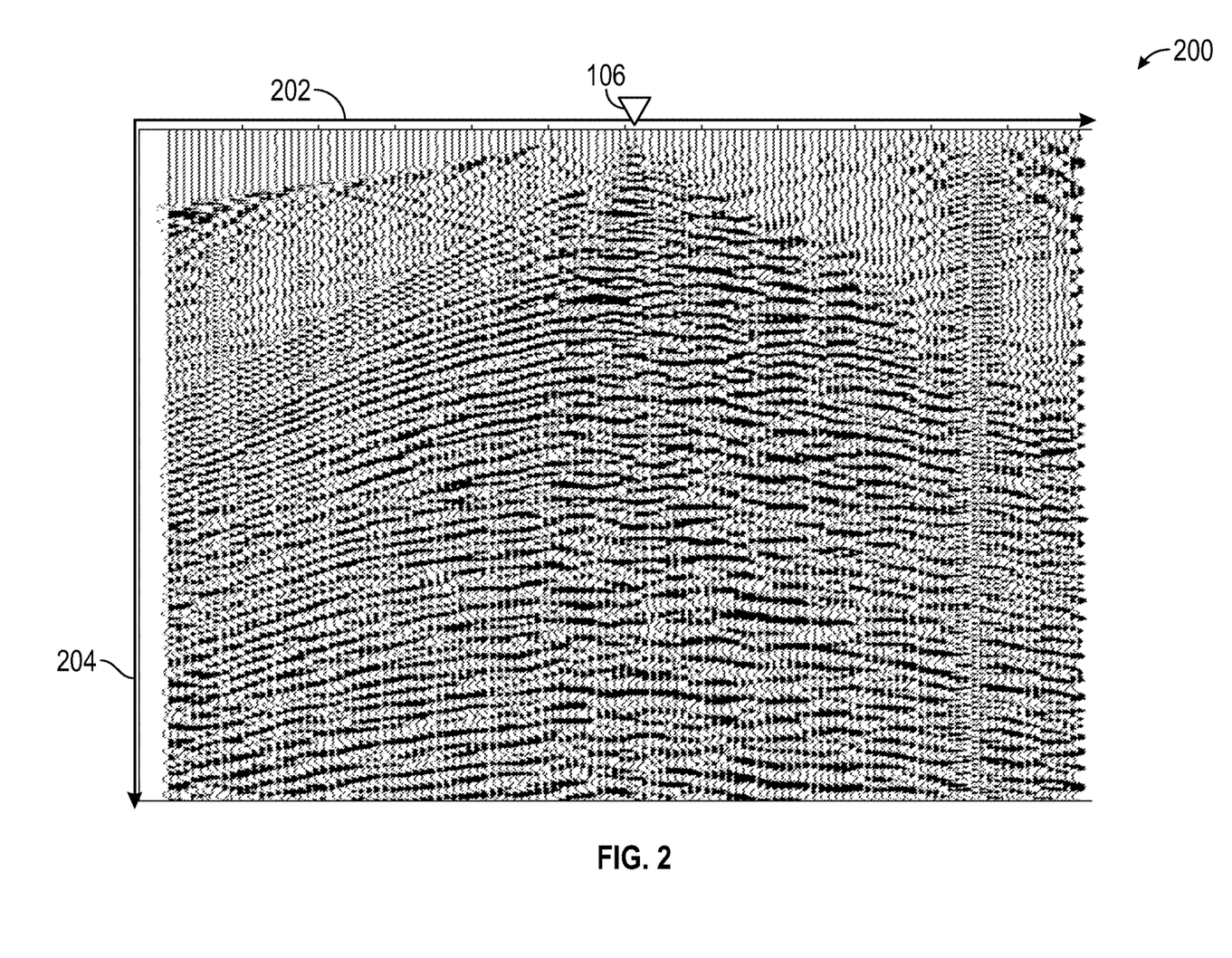
FIG. 2 depicts a seismic data set in accordance with one or more embodiments.

FIG. 2 shows seismic data (200) generated by a seismic source at a seismic source location (106) and recorded by a plurality of seismic receivers (114) at locations (202) separated by different distances from the seismic source location (106). The horizontal axis shows the surface location (202) of the seismic receivers (114) and the vertical axis (204) shows the recording time elapsed after the activation of the seismic source at the seismic source location (106). Each vertical line, often termed a "seismic trace", represents the ground motion recorded by one seismic receiver (114).

Reflected seismic waves appear in FIG. 2 as approximately synchronous high-amplitude events on adjacent seismic traces across the display. Seismic data (200) may include reflections from many discontinuities at different locations within the subterranean region and may include reflected seismic PP-waves (110) and converted seismic PS-waves (112).

Seismic data (200) must be processed to construct seismic images. Processing typically includes steps to attenuate unwanted signals, such as ground-roll and noise, determine a seismic propagation velocity model, and form an image of seismic reflectors within the subterranean region of interest. Full waveform inversion (FWI) is a velocity analysis method for inverting measured seismic data to determine a multidimensional seismic propagation velocity model of a region subterranean of interest.

Figure 3:
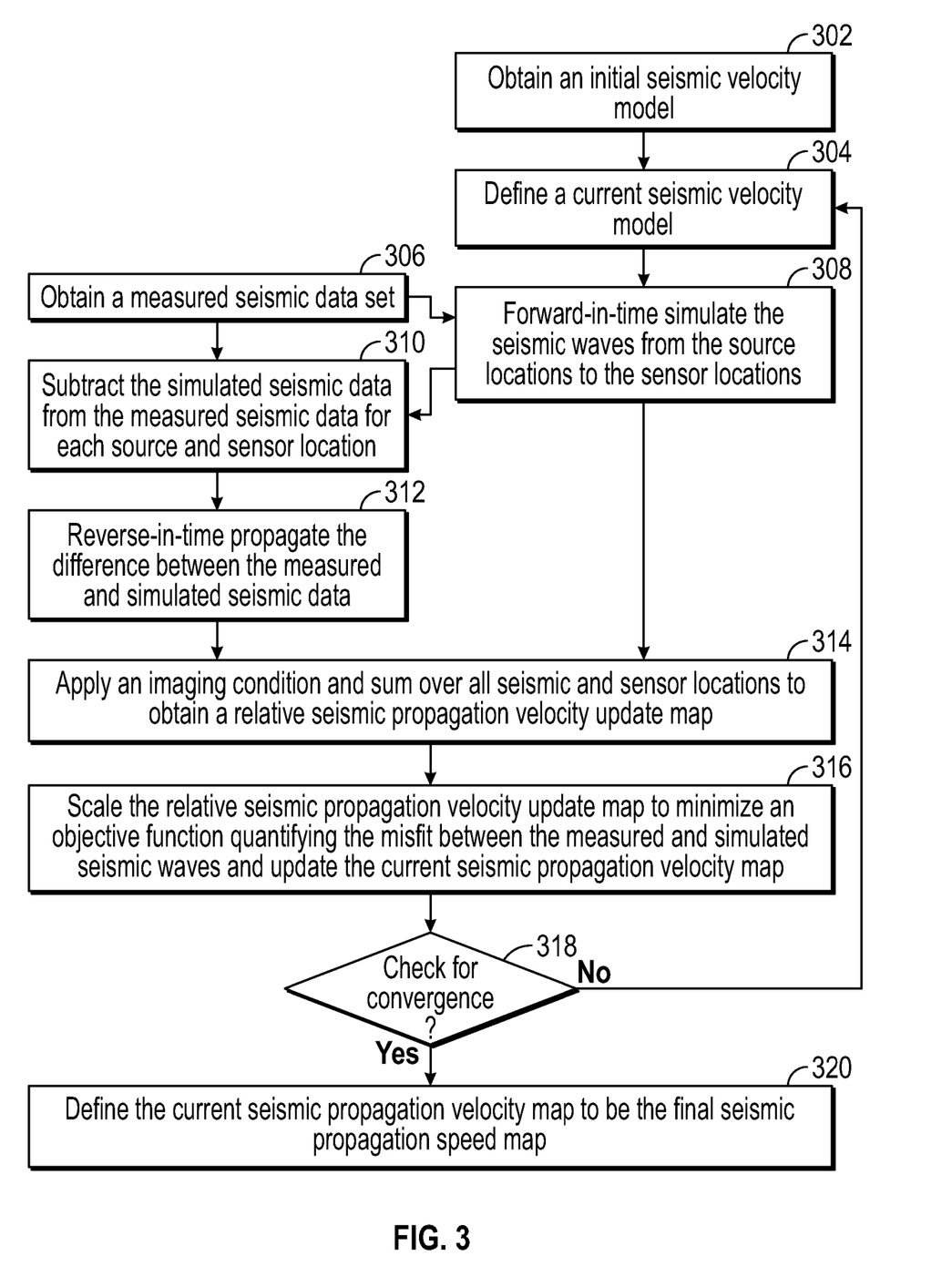
FIG. 3 shows a flowchart in accordance with one or more embodiments

FIG. 3 shows a flowchart for performing FWI, in accordance with one or more embodiments. FWI determines a multidimensional seismic propagation velocity model. Seismic propagation velocity within the model may be in one, two, or three dimensions depending upon the intended application of the model, the measurement distribution, and the spatial heterogeneity of the seismic propagation velocity within subterranean region described by the model.

In Block 302, an initial estimate of the seismic propagation velocity model for a region of interest (102) is obtained.

The initial estimate of the seismic propagation velocity model may be a simple function of depth alone or may also vary as a function of horizontal position. The seismic propagation velocity model may be based on velocity models for adjacent geographical regions, or from borehole measurements, or from simpler velocity analysis methods.

In Block 304 the initial seismic propagation velocity model is first assigned to be the current seismic propagation velocity model. Later in the flow, the current seismic propagation velocity model will be updated iteratively as part of an inversion to obtain a more accurate estimate of the true seismic wave propagation velocity in the subterranean region.

In Block 306 measured seismic data are obtained from the seismic survey (100), according to one or more embodiments. The locations of the seismic sources (106) and seismic receivers (114) at which seismic data was recorded is passed to Block 308 for use in the simulation of predicted seismic data.

In Block 308, FWI may use seismic wave propagation simulation by a computer to predict the seismic data expected for the current seismic propagation velocity model and the seismic source and seismic receiver locations at which the measured seismic data was recorded. FWI may use a two-way elastic wave propagator, or a simplified version of the two-way elastic wave propagator, such as the acoustic wave propagator or Helmholtz wave propagator, to simulate the propagation of seismic waves within the subterranean region of interest (102). The simplified version of the two-way elastic wave propagator may be a one-way elastic or one-way acoustic wave propagator, in accordance with one or more embodiments. This simulation of seismic wave propagation and of the seismic waves measured by the seismic receivers (116) may performed using a computer system (802) shown in FIG. 8.

In Block 310, the simulated seismic data may be subtracted from the measured seismic data, in accordance with one or more embodiments. The result of the subtraction of the simulated seismic data from the measured seismic data is seismic difference data. Seismic difference data is a plurality of seismic traces, one for each pair of a seismic receiver location and a seismic source location, which is determined by the difference between the measured seismic data and the simulated seismic data.

In Block 312 the seismic difference data may be used as virtual sources to simulate the propagation of a plurality of seismic difference waves backwards in time. Just as the seismic wave propagation simulation described in Block 308 required a seismic wave propagator so does the seismic wave propagation backward in time performed in Block 312. The seismic wave propagator used in Block 312 may be chosen from the same set of seismic wave propagators, including one-way wave propagators, used in Block 308.

In Block 314, in accordance with one or more embodiments, an imaging condition may be applied to determine the relative magnitude of the seismic velocity change to be added to the seismic propagation velocity model at each location in the subterranean region. The imaging condition may use the principle that the backward-in-time simulated seismic waves determined in Block 312 and the forward-in-time simulated waves determined in Block 308 are collocated in the subterranean region of interest only at a spatial location where the forward-in-time propagating waves generated the reflected seismic waves. This principle of collocation may be implemented approximately as a zero-lag cross-correlation, or as a convolution combined with as an illumination compensation step, or as a deconvolution. Jones, "Tutorial: migration imaging conditions", First Break, Vol. 32, pp 45-55, December 2014, provides further information and examples of imaging conditions.

In Block 316 an "objective function" may be calculated. The object function quantifies the difference between the simulated and the measured seismic data set. In accordance with one or more embodiments, the objective function may be the square of the difference between the measured seismic waves and the simulated seismic waves, summed over time samples, seismic receiver locations and seismic source locations. Alternatively, in accordance with one or more embodiments the objective function may be the square of the difference between the measured seismic waves and the simulated seismic waves, summed over seismic receiver locations and seismic source locations for a single frequency component. The relative seismic propagation velocity map obtained in Block 314 may be multiplied by a scalar to minimize the objective function when applied to the seismic data set simulated for the scaled seismic propagation velocity model.

In Block 318, the FWI may be checked for convergence. In accordance with one or more embodiments, the check for convergence may include evaluating the objective function and determining if a convergence criterion has been satisfied. The convergence criterion may be a value of the objective function falling below a predetermined value indicating that a satisfactory degree of similarity between the simulated seismic data and the measured seismic data has been achieved. Alternatively, a convergence criterion may be defined by the decrease in the value of the objective falling between the current iteration and the previous iteration by less than a predetermined amount. Alternatively, the FWI may terminate when a predetermined maximum number of iterations have been completed.

If the FWI has converged the current seismic propagation velocity model may be designated as the final updated seismic propagation velocity model in Block 320 and the FWI process terminated. If the FWI has not converged, then the update to current seismic velocity model may be added to the current seismic velocity model to form a new current seismic wave propagation velocity model in Block 304, and Blocks 306, 308, 310, 312, 314, 316 and 318 repeated iteratively.

It is of significance to note that in Block 308 and Block 312 a seismic wave propagator is used to simulate the propagation of seismic waves at every iteration.

Figure 4:
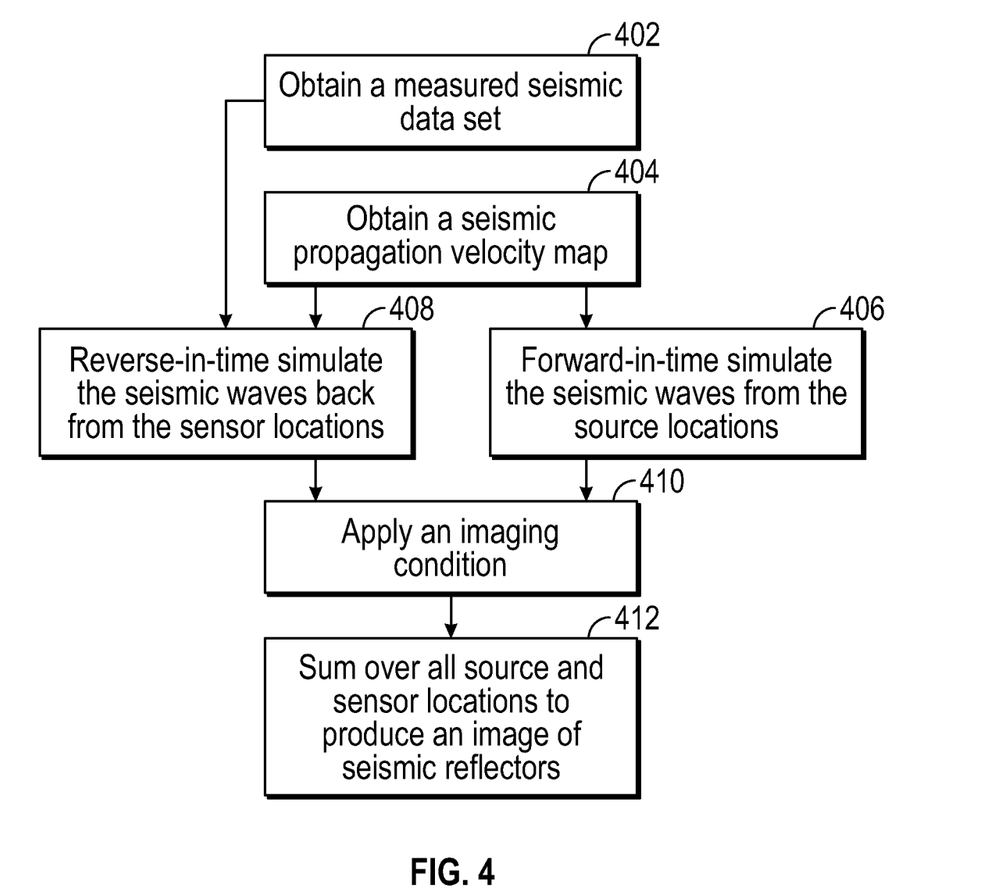
FIG. 4 shows a flowchart in accordance with one or more embodiments.

FIG. 4 shows a flowchart illustrating Reverse Time Migration (RTM). RTM is a method of processing seismic reflection data to generate images of seismic reflectors within a subterranean region of interest. These seismic reflectors may be a boundary between two rock layers, or they may be a fault or a fracture or group of fractures within a rock layer, or they may be a boundary between the two different fluids within rock pores, or they may be a boundary between a fluid layer and a rock layer. Strong seismic reflections are generated where a large seismic impedance contrast exists between the medium on different sides of a boundary or interface. RTM may be implemented using the computer system (802).

In Step 402, in accordance with one or more embodiments, RTM obtains seismic data (200). The seismic data (200) may be recorded with single-component seismic receivers (114), or multicomponent seismic receivers, or a combination of single-component (114) and multicomponent seismic receivers.

In Step 404, RTM may obtain, in accordance with one or more embodiments, a seismic wave propagation velocity model. This seismic wave propagation velocity model may be obtained by performing FWI, or from a plurality of other velocity analysis methods familiar to one of ordinary skill in the art.

In Step 406, in accordance with one or more embodiments, RTM uses a seismic wave propagator to simulate the propagation of seismic waves from the seismic receiver (114) locations backwards-in-time, or in "reverse time", into the subterranean region of interest (102). The seismic wave propagator may use an elastic wave propagator or a simplified version of the elastic wave propagator such as an acoustic wave propagator or a Helmholtz wave propagator. The simplified version of the elastic wave propagator, acoustic wave propagator or a Helmholtz wave propagator may be a one-way seismic wave propagator.

Furthermore, in Step 408, in accordance with one or more embodiments, RTM uses a seismic wave propagator to simulate the propagation of seismic waves forward in time from the seismic source location (106) into the subterranean region of interest (102). The seismic wave propagator used in Block 408 may be selected from the same set of seismic wave propagators listed in the previous paragraph.

In Step 410, in accordance with one or more embodiments, RTM may use an imaging condition that employs the principle that the backward-in-time simulated seismic waves from the seismic receivers (114) and the forward-in-time simulated waves from the seismic source (106) are collocated in the subterranean region of interest only at a spatial location where the forward-in-time propagating waves generated the reflected seismic waves.

Finally, in Step 412, in accordance with one or more embodiments, the reflection amplitude value determined by the imaging condition may be summed over all seismic source locations (106) and all seismic receivers (114) to produce a RTM image of reflectors of seismic waves in the subterranean region of interest (102).

Figure 5:
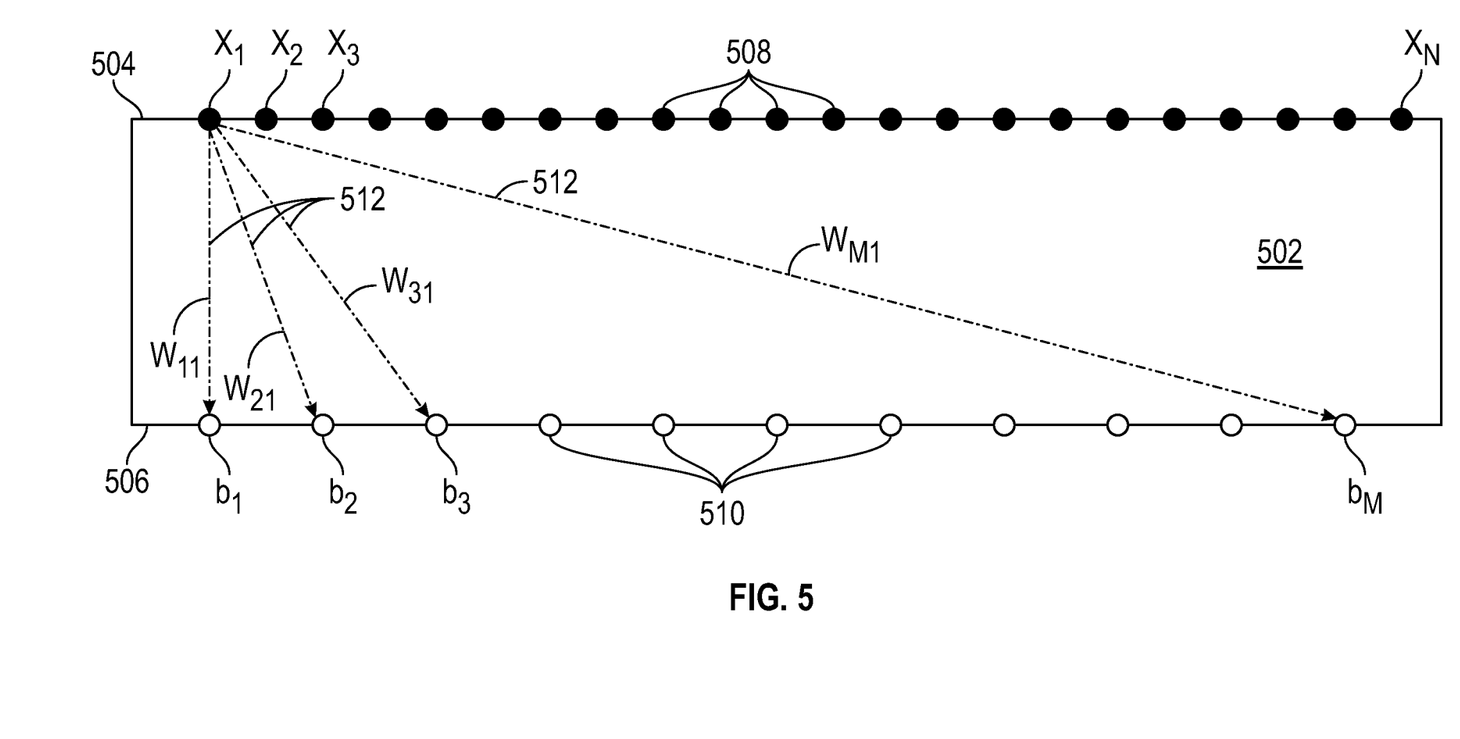
FIG. 5 shows a system in accordance with one or more embodiments.

FIG. 5 depicts the determination of a one-way seismic wave propagator across a layer (502) from a first bounding depth (504) to a second bounding depth (506), in accordance with one or more embodiments. Although FIG. 5 depicts the first bounding depth (504) to be an upper bounding depth and the second bounding depth (506) to be a lower bounding depth (506), the first bounding depth (504) may be a lower bounding depth and the second bounding depth (506) may be an upper bounding depth, without departing from the scope of the invention.

In accordance with one or more embodiments, mono-frequency seismic waves on the first bounding depth (504) may be obtained at N discrete positions (508). The mono-frequency seismic waves at each discrete position on the first bounding depth (504) may be denoted $x_i$, i=1, 2, ..., N. The N discrete positions (508) may be uniformly distributed or may be non-uniformly distributed over the first bounding depth (504). The mono-frequency seismic waves on the second bounding depth (506) may be determined at M discrete positions (510). The mono-frequency seismic waves at each discrete position on the second bounding depth (504) may be denoted $b_i$, i=1, 2, ..., M. The M discrete positions (510) may be uniformly distributed or non-uniformly distributed over the second bounding depth (506).

In accordance with one or more embodiment, $b_i$ may be determined based, at least in part, on $x_i$. For example, $b_i$ may be determined using a two-way elastic wave propagator, or the two-way acoustic wave propagator, or the two-way Helmholtz wave propagator. Each of these wave equations may be implemented by one of a number of methods well known to one of ordinary skill in the art, including without limitation, a finite-difference time-domain method, a finite-difference frequency-domain method, discrete Galerkin time-domain method, a finite-element time-domain method, a finite-element frequency-domain method, and discrete Galerkin frequency-domain method.

Since the layer (502) is invariant in the vertical direction, no reflected waves or refracted waves are generated within this layer and the seismic waves $b_i$ may be related to the seismic waves $x_i$ by one-way seismic wave propagators (512) without approximation:

$$b_j = W_{ji} x_i \qquad \text{Equation (1)}$$

where $W_{ji}$ is the one-way seismic wave propagator between the location i at the first bounding depth (504) and the location j at the second bounding depth (506), and the Einstein summation convention is applied. Equation (1) holds irrespective of the seismic source location (106), thus equation (1) may be extended to become:

$$b_{jk} = W_{ji} x_{ik} \qquad \text{Equation (2)}$$

where k=1, 2, ..., K indexes the seismic source location (106). Equation (2) may be written as a matrix equation:

$$B = WX \qquad \text{Equation (3)}$$

where $B = b_{jk}$, $W = W_{ji}$, and $X = x_{ik}$.

In principle, if K≥M, equation (3) is called "over-determined" and may be inverted to find the matrix of one-way seismic wave propagators:

$$W = BX^{-1}. \qquad \text{Equation (4)}$$

where the superscript $X^{-1}$ denotes the matrix inverse of X. However, the size of X for practical cases makes finding its inverse directly challenging even for large computer systems. Instead, in accordance with one or more embodiments, equation (3) may be decomposed into a plurality of smaller problems of the form:

$$b_i^T = X^T w_i^T \qquad \text{Equation (5)}$$

where $b_i$ and $w_i$ are the i-th row of the matrices B and W, and the superscript T denotes the transpose operation. This decomposition is possible because each row of the matrix B is dependent only on the corresponding row of the matrix W.

Equation (5) may now be efficiently solved numerically, in accordance with one or more embodiments, using parallel computation. A numerical solution algorithm may be selected from a variety of mathematical methods well known to one of ordinary skill in the art including, without limitation, a biconjugate gradient method, a biconjugate gradient stabilized method, a generalized minimal residual method, a quasi-minimal residual method, a genetic algorithm, and a simulated annealing method.

Figure 6:
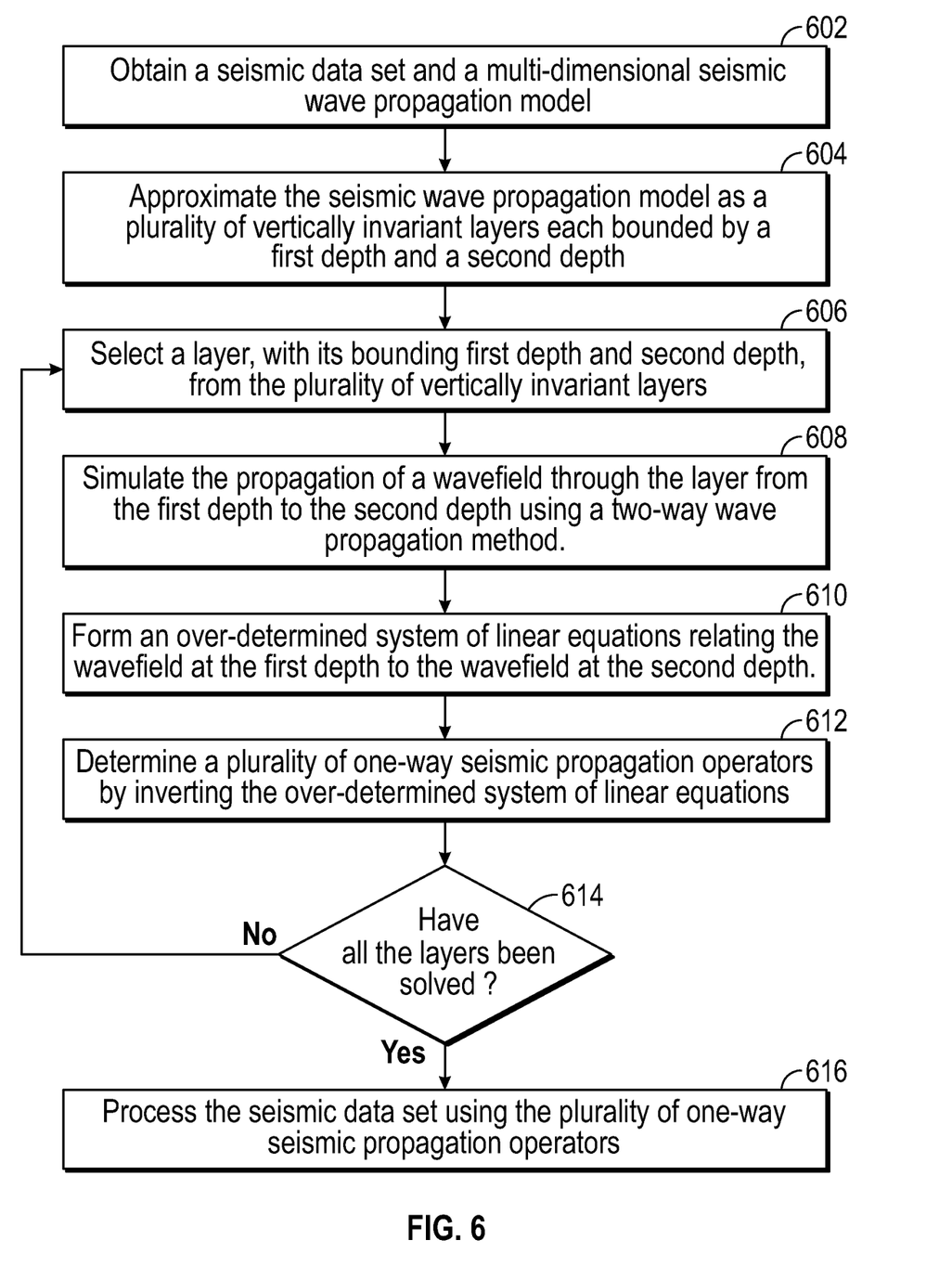
FIG. 6 shows a flowchart in accordance with one or more embodiments.

FIG. 6 shows a flowchart in accordance with one or more embodiments. In Block 602 a seismic data set (200) and seismic propagation velocity model for a subterranean region are obtained. The values of seismic propagation velocity within the model may vary along one, two, or three axes. The seismic propagation velocity model may include only one velocity at each spatial location corresponding to a seismic P-wave velocity or may include a P-wave and an S-wave velocity. Further, the seismic propagation velocity model may include a density model.

In Block 604, the seismic propagation velocity model may be approximated by a plurality of layers, adjacent to one another, with each layer bounded by a first depth and a second depth. The seismic propagation velocity and the density are invariant in the vertical direction within the layer and may be an average of the true velocities between the first depth and the second depth in the seismic propagation velocity model.

In Block 606, one of the layers created in Block 604 is selected together with its first and second bounding depths. In Block 608, the propagation of a seismic wave from the first bounding depth to the second bounding depth is simulated using a two-way propagator. The simulation may be conducted in the frequency domain or in the time domain. Seismic waves simulated in the time domain may be transformed into the frequency domain by any one of a number of methods known to one of ordinary skill in the art including, without limitation, a Fourier transform, a non-uniform Fourier transform, and a fast Fourier transform.

In Block 610, in accordance with one or more embodiments, an over-determined system of linear equations may be formed relating a mono-frequency component of the seismic wave at the second bounding depth to a mono-frequency component of the seismic wave at the first bounding surface. In Block 612, the over-determined system may be solved using any one of a plurality of standard numerical algorithms well known to one of ordinary skill in the art to determine a plurality of one-way seismic wave propagators. These one-way seismic wave propagators may be stored in computer memory for use in processing seismic data.

In Block 614, in accordance with one or more embodiments, if there remains a layer, a new layer together with its first bounding depth and its second bounding depth is selected. If one-wave seismic propagators have been determined for all the layers the workflow proceeds to Block 616.

In Block 616, the one-way seismic propagators for the plurality of layers may be used to process a seismic data set for the subterranean region of interest. The processing may include FWI and/or RTM and the results of processing the seismic data may be a seismic wave propagation velocity model, a seismic reflection image, or a seismic attribute image. The seismic wave propagation velocity model, seismic reflection image, or seismic attribute image may be used to determine a likelihood of a presence and a location of a hydrocarbon reservoir and to plan a location at which to drill a borehole and plan a trajectory of the borehole.

Figure 7:
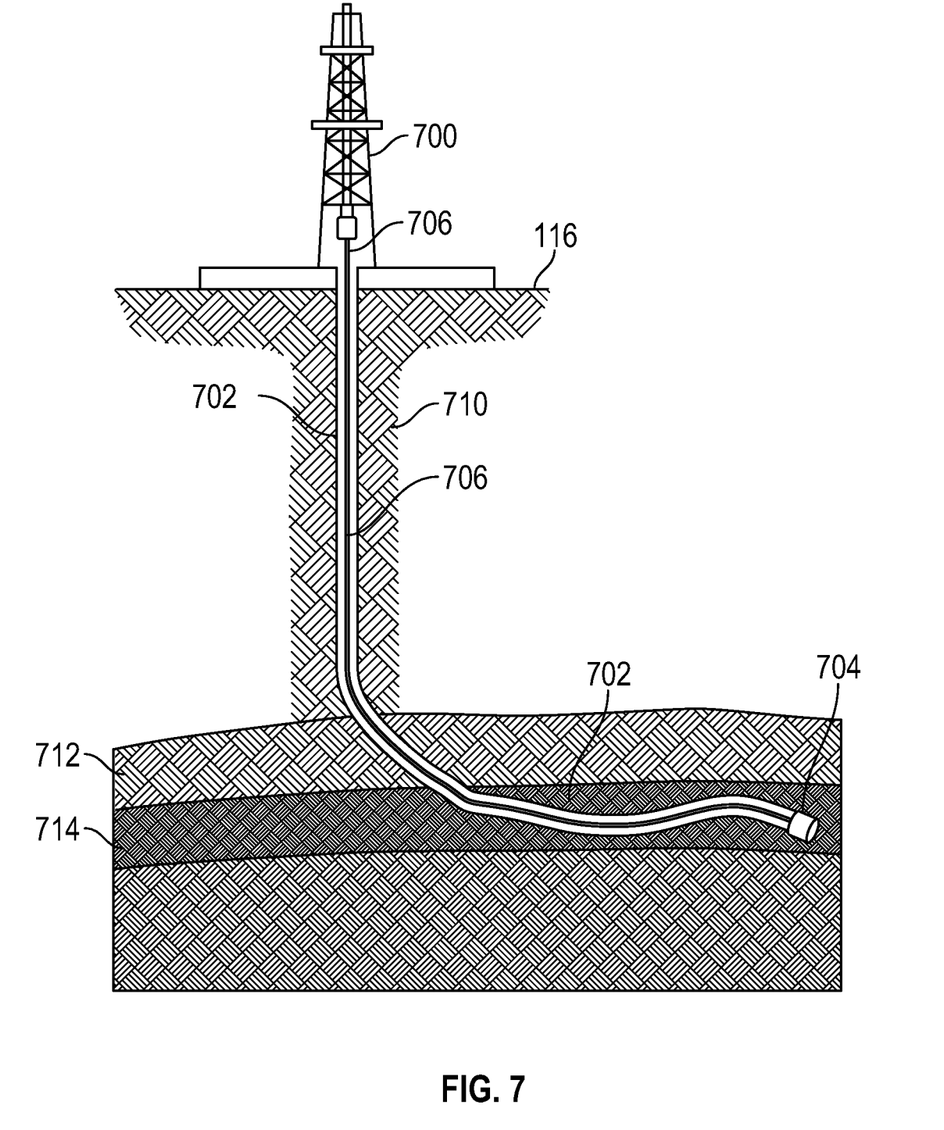
FIG. 7 shows a system in accordance with one or more embodiments.

FIG. 7 illustrates systems in accordance with one or more embodiments. As shown in FIG. 7, a borehole (702) may be drilled by a drill bit (704) attached by a drillstring (706) to a drill rig (700) located on the Earth's surface (116). The borehole may traverse a plurality of overburden layers (710) and one or more cap-rock layers (712) to a hydrocarbon reservoir (714). A seismic wave propagation velocity model, a seismic image, and/or a seismic attribute image may be used to plan and perform the trajectory of the borehole (706) to intersect as many subterranean regions in which hydrocarbons are expected to be present.

Figure 8:
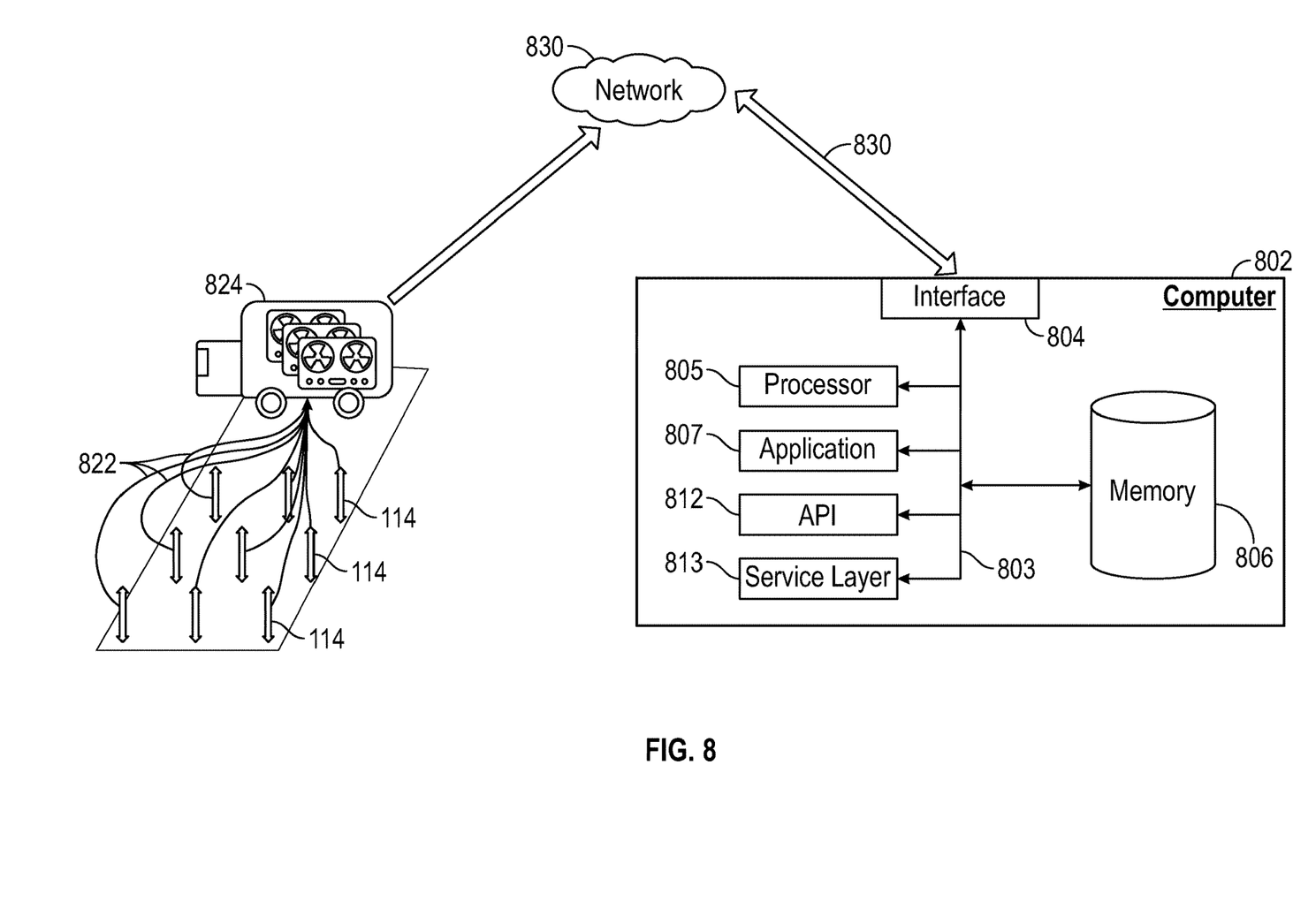
FIG. 8 shows a system in accordance with one or more embodiments.

FIG. 8 shows a seismic recording and processing system in accordance with one or more embodiments. The data recorded by a plurality of multicomponent seismic receivers (114) may be transmitted to a seismic recording facility (824) located in the vicinity of the seismic survey (100). The seismic recording facility may be one or more seismic recording trucks (824). The plurality of seismic receivers (114) may be in digital or analog telecommunication with the seismic recording facility (824). The telecommunication may be performed over telemetry channels (822) that may be electrical cables, such as coaxial cables, or may be performed wireless using wireless systems, such as Wi-Fi or Bluetooth. Digitization of the seismic data may be performed at each multicomponent seismic receiver (114), or at the seismic recording facility (824), or at an intermediate telemetry node (not shown) between the multicomponent seismic receiver (114) and the seismic recording facility (824).

The seismic data may be recorded at the seismic recording facility (824) and stored on non-transitory computer memory. The computer memory may be one or more computer hard-drives, or one or more computer memory tapes, or any other convenient computer memory media familiar to one skilled in the art. The seismic data may be transmitted to a computer (802) for processing The computer (802) may be located in or near the seismic recording facility (824) or may be located at a remote location that may be in another city, country, or continent. The seismic data may be transmitted from the seismic recording facility (824) to a computer (802) for processing. The transmission may occur over a network (830) that may be a local area network using an ethernet or Wi-Fi system, or alternatively the network (830) may be a wide area network using an internet or intranet service. Alternatively, seismic data may be transmitted over a network (830) using satellite communication networks. Most commonly, because of its size, seismic data may be transmitted by physically transporting the computer memory, such as computer tapes or hard drives, on which the seismic data is stored from the seismic recording facility (802) to the location of the computer (802) to be used for processing.

FIG. 8 further depicts a block diagram of a computer system (802) used to provide computational functionalities associated with described algorithms, methods, functions, processes, flows, and procedures as described in this disclosure, according to one or more embodiments. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. The illustrated computer (802) is communicably coupled with a network (830). In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application (for example, executing on another computer (802)) and responding to the received requests by processing the said requests in an appropriate software application. In addition, requests may also be sent to the computer (802) from internal users (for example, from a command console or by other appropriate access method), external or third-parties, other automated applications, as well as any other appropriate entities, individuals, systems, or computers.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (813). The API (812) may include specifications for routines, data structures, and object classes. The API (812) may be either computer-language independent or dependent and refer to a complete interface, a single function, or even a set of APIs. The service layer (813) provides software services to the computer (802) or other components (whether or not illustrated) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or another suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804 includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) includes at least one computer processor (805). Although illustrated as a single computer processor (805) in FIG. 12, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) also includes a memory (806) that holds data for the computer (802) or other components (or a combination of both) that can be connected to the network (830). For example, memory (806) can be a database storing data consistent with this disclosure. Although illustrated as a single memory (806) in FIG. 12, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing computer (802), wherein each computer (802) communicates over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method, comprising:
obtaining, from a seismic survey, a seismic data set and a multi-dimensional seismic wave propagation velocity model;
using a seismic processing system:
approximating the seismic wave propagation velocity model as a plurality of layers each bounded by a first bounding depth and a second bounding depth,
for each of the plurality of layers:
simulating propagation of a seismic wave from the first bounding depth to the second bounding depth using a two-way seismic wave propagation simulator;
forming an over-determined system of linear equations relating at least one mono-frequency component of the seismic wave at the first bounding depth to at least one mono-frequency component of the seismic wave at the second bounding depth;

determining a plurality of one-way seismic wave propagation operators by inverting the over-determined system of linear equations; and verifying that the plurality of one-way seismic wave propagation operators has been determined for each layer of the plurality of layers, processing the seismic data set using at least one of the one-way seismic wave propagation operators for at least one of layer;

using a computer processor:

determining a presence and a location of a hydrocarbon reservoir based, at least in part, on the processed seismic data set, and determining a borehole trajectory through a subterranean region of interest based, at least in part, on the presence of the hydrocarbon reservoir; and drilling, using a drilling system, a borehole guided by the borehole trajectory.

2. The method of claim 1, wherein the seismic wave propagation velocity model comprises:

a seismic P-wave propagation velocity model, a seismic S-wave propagation velocity model, and a density model.

3. The method of claim 1, wherein inverting the over-determined system of linear equations comprises inverting a plurality of independent systems of linear equations, wherein each of the independent systems of linear equations comprises equating a first vector to a matrix-vector product of a matrix and a second vector.

4. The method of claim 3, wherein the first vector represents an amplitude and a phase of a mono-frequency component of the seismic wave at a plurality of locations at the second bounding depth, the second matrix represents an amplitude and a phase of a plurality of one-way seismic wave propagators, and the second vector represents an amplitude and a phase of a mono-frequency component of plurality of seismic waves at a plurality of locations at the first bounding depth.

5. The method of claim 1, wherein inverting a plurality of independent systems is performed using at least one of a biconjugate gradient method, a biconjugate gradient stabilized method, a generalized minimal residual method, a quasi-minimal residual method, genetic algorithm, and a simulated annealing algorithm.

6. The method of claim 1, wherein the two-way seismic wave propagation simulator is a two-way frequency-domain seismic wave propagation simulator.

7. A system, comprising:

a seismic source to emit radiated seismic P-waves;

a plurality of seismic receivers for detecting and recording a seismic data set generated by the radiated seismic P-waves;

a seismic processor, configured to:

receive a seismic data set and a multi-dimensional seismic wave propagation velocity model, approximate the seismic wave propagation velocity model as a plurality of layers each bounded by a first bounding depth and a second bounding depth, for each of the plurality of layers:

simulate propagation of a seismic wave from the first bounding depth to the second bounding depth using a two-way seismic wave propagation simulator;

form an over-determined system of linear equations relating at least one mono-frequency component of the seismic wave at the first bounding depth to at least one mono-frequency component of the seismic wave at the second bounding depth; and determine a plurality of one-way seismic wave propagation operators by inverting the over-determined system of linear equations;

verify that the plurality of one-way seismic wave propagation operators has been determined for each layer of the plurality of layers, and process the seismic data set using at least one of the one-way seismic wave propagation operators for at least one of layers;

a computer processor, configured to:

determine a presence and a location of a hydrocarbon reservoir based, at least in part, on the processed seismic data set, and determine a borehole trajectory through a subterranean region of interest based, at least in part, on the presence of the hydrocarbon reservoir; and a drilling system, configured to drill a borehole guided by-the borehole trajectory.

8. The system of claim 7, wherein the seismic wave propagation velocity model comprises:

a seismic P-wave propagation velocity model, a seismic S-wave propagation velocity model, and a density model.

9. The system of claim 7, wherein inverting the over-determined system of linear equations comprises inverting a plurality of independent systems, wherein each of the independent systems comprise equating a first vector to a matrix-vector product of a matrix and a second vector.

10. The system of claim 9, wherein the first vector represents an amplitude and a phase of a mono-frequency component of a seismic wave at a plurality of locations at the second bounding depth, the second matrix represents an amplitude and a phase of a plurality of one-way seismic wave propagator, and the matrix representing an amplitude and a phase of a mono-frequency component of a plurality of seismic waves at a plurality of locations at the first bounding depth.

11. The system of claim 7, wherein inverting a plurality of independent systems is performed using at least one of a biconjugate gradient method, a biconjugate gradient stabilized method, a generalized minimal residual method, a quasi-minimal residual method, genetic algorithm, and a simulated annealing algorithm.

12. The system of claim 7, wherein the two-way seismic wave propagation simulator is a two-way frequency-domain seismic wave propagation simulator.

* * * * *